United States Patent [19]
Kirst et al.

[11] 3,936,311
[45] Feb. 3, 1976

[54] COATING MATERIAL FOR BUILDINGS

[75] Inventors: Paul-Gerhard Kirst; Karl Maier; Heinz Winkler, all of Burghausen, Germany

[73] Assignee: Wacker-Chemie GmbH, Munich, Germany

[22] Filed: Aug. 5, 1974

[21] Appl. No.: 494,938

[30] Foreign Application Priority Data
Aug. 14, 1973 Germany............................ 2341085

[52] U.S. Cl. ...................... 106/90; 106/92; 106/93; 106/95; 106/119; 106/314
[51] Int. Cl.$^2$... C04B 1/00; C04B 7/02; C04B 7/352
[58] Field of Search ........... 106/90, 92, 93, 95, 119, 106/314

[56] References Cited
UNITED STATES PATENTS

| | | | |
|---|---|---|---|
| 2,934,445 | 4/1960 | Jones et al. | 106/95 |
| 3,090,692 | 5/1963 | Kelly et al. | 106/92 |
| 3,093,505 | 6/1963 | Conway | 106/90 |
| 3,623,895 | 11/1971 | Nitzsche et al. | 106/119 |

Primary Examiner—J. Poer
Attorney, Agent, or Firm—Allison C. Collard

[57] ABSTRACT

A coating material for buildings which renders them water repellent, consisting of cement and/or lime, fillers and water, which contains as a hydrophobing additive 0.1 – 3% by weight, calculated on dry substance, of one or more water soluble esters of sacharose with fatty acids having preferably a chain length of 10–20 carbon atoms.

5 Claims, No Drawings

COATING MATERIAL FOR BUILDINGS

The present invention relates to a coating material for buildings which renders them water repellent.

It is known that buildings can be made water repellent or hydrophobic by coatings of lime or cement and by plaster when it has an addition of powdery silicones or salts of fatty acids, e.g. zinc stearate. As a result, buildings coated with the materials containing the above mentioned hydrophobing agents will prevent rain from seeping through, and protect the walls below.

The coating materials made with powdery hydrophobing additives have the disadvantage that they cannot be properly wetted when mixed with water. As a consequence, a smaller amount of hydrophobing agent will have to be used than would be required for making the coating sufficiently water repellent. Another drawback of the additives is that the coating materials for buildings become more difficult to process.

It is an object of the present invention to provide a coating material for buildings containing a hydrophobing agent which will not detract from the workability of the coating agents and which will yet impart to the coatings a high degree of water repellence after application to the building.

According to the invention, such a protective coating for buildings consists of cement and/or lime, fillers and water, containing from 0.1–3% by weight, preferably 0.2–2% by weight, calculated on the dry substance, of at least one water-soluble ester of sacharose and fatty acids.

The hydrophobing agents according to the invention do not detract in the least from the processing properties of the coating materials for buildings. Since they are soluble in water, the wettability of the components of the coating by water is not impaired. However, when the coating material has been applied and set, the additives will cause a considerable degree of hydrophobing so that the seeping of water into the walls of the building is completely prevented.

In principle, all water-soluble esters of fatty acids with sacharose are useful. More particularly, the fatty acids should have a chain length of 10–20 C-atoms. The following formula expresses the structure of the additives:

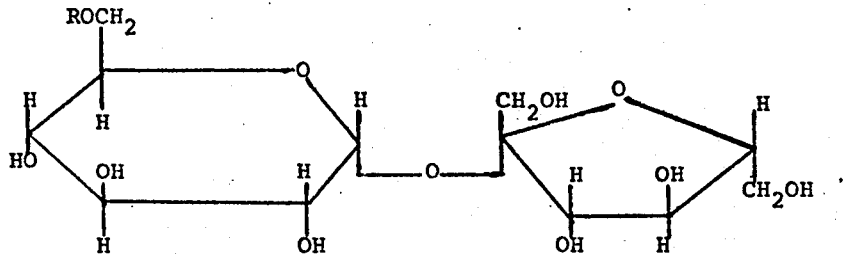

Alternatively, the radical R can also be bonded to the other two $CH_2O-$ groups.

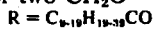
$R = C_{9-19}H_{19-39}CO$

As a rule, the mono-, di-, and triesters or their mixtures are used. In the di- and triesters, the other $CH_2OH$ groups in the above formula are esterified with fatty acids. Examples for the acid components are the following:

Capric acid, lauric acid, myristic acid, stearic acid, palmitic acid, arachic acid, oleic acid, linoleic acid, and mixtures thereof. Both saturated and unsaturated acids are important. Preferably, the acids used have 16–18 carbon atoms.

One way of preparing the esters consists of reesterification of, e.g. fatty acid methyl ester, with sacharose. The products are mostly of powdery consistency.

Examples of coating materials for buildings, which may use the additives, are cement and/or lime-containing plasters, particularly high-grade plasters, mortars, priming materials and caulking slurries. Those materials consist of cement and/or lime, fillers and water, and if desired, many other additives. From these components (with the exception of water) a homogeneous mixture is prepared by known procedures. The mixture can be stored. Water is only added a short time before use of the coating material, for instance at the building site.

The ordinary coating materials for buildings contain for instance;

One part by weight of cement and/or lime;
1–12 parts by weight of filler, and
10–50 parts by weight of water, calculated on the dry substances.

For preparing plasters the following formulation may be used, which serves as a guide line:
1 part by weight of lime and/or cement;
3–12 parts by weight of fillers, grain size 0.7–7 mm
10–30% by weight of water, calculated on dry substance.

Priming materials consist mostly of
1 part by weight of cement and/or lime
1–5 parts by weight of fillers of a grain size 0.01–2 mm and
15–40% by weight of water calculated on dry substance.

Mortars and caulking slurries may have, for instance, the following composition:
1 part by weight cement and/or lime
2–5 parts by weight fillers, grain size 0.01–7 mm, and
10–50% of water.

These formulations are given for guidance; to them may be added hydrophobing additives in the quantities above indicated without impairing the processing properties.

Lime and cement may be taken in the usual qualities, e.g., white cement, Portland cement, blast furnace cement, alumina melt cement, hydrated lime, e.g. white lime or dolomite lime, carbide lime, highly hydraulic lime and/or mixtures of these.

As fillers we may use any weather-proof material, e.g. stone materials, quartz sand, Kaolin, calcium carbonate or calcium carbonate powder, dolomite, feldspar, barium sulfate, light spar, chalk, and/or highly dispersed silica, of varying grain size (for instance 0.07–7 mm). As additives we may use e.g. titanium dioxide, zinc oxide and/or zinc sulfide in amounts up to 15% by weight.

Frequently, leveling additives are added to the coating materials for buildings such as hydroxycarboxylic acids, lignin sulfonates, melamin resin sulfonates.

In many cases, casein in amounts of 0.2-5% by weight, calculated on dry substance, is added to the coating materials to achieve self-leveling properties.

Other auxiliaries, particularly for water retention, are watersoluble cellulose ethers, e.g. methyl cellulose or starch ether, or polyvinyl alcohols in amounts of 0.01-0.5% by weight calculated on the dry substance of the coating material for buildings. Also, anionic or non-anionic wetting agents, such as polyphosphates, naphthalene sulfonates, ammonium and sodium acrylic acid salts, or mixtures thereof.

Other frequent additives are redispersible synthetic powders in quantities of 0.1-5% by weight, calculated on the dry substance, or synthetics in the form of aqueous dispersions to provide a good adhesion of the coating to the substrate. Examples of such synthetic powders or dispersions are vinyl acetate homo or copolymers, e.g. ethylene vinylacetate copolymers, butadiene styrene copolymers, acrylic ester homo or copolymers, or mixtures thereof. These polymers often contain silanol groups in the polymer structure in order to improve their adhesive power.

Further additives are:
Foam-preventing agents, e.g. silicone oils,
Alcohols and hydrocarbons in amounts of 0.1-0.5% by weight
Fungicides, such as phenol or cresol derivatives, mercury-or tin organic compounds in amounts of 0.01-2% by weight
Dyes, such as organic or inorganic colored pigments, and anti-freezes, such as methanol and glycol in amounts of 1-5% by weight.

EXAMPLE I

A lime cement plaster is made according to the following formulation:
37.00 kg quartz sand grain 0.2 to 3.5 mm
38.00 " quartz sand 0.2-0.7 mm
25.00 " quarts sand 0.1-0.4 mm
8.00 " quartz powder below 40 $\mu$ particle size
2.00 " Kaolin with particle size ca. 2 $\mu$
4.00 " titanium dioxide (rutile)
4.00 " white cement
8.00 " calcium hydroxide
0.02 " methylcellulose
3.00 " redispersible polyvinylacetate copolymer powder base ethylenevinylacetate, as well as various amounts of
  a. sacharose monopalmitate
  b. sacharose distearate
  c. zinc stearate
  d. powdered silicone building protective agent The plasters are made into a paste with about 20 liters of water until they have a processable consistency, and the time needed is measured. At this time, the wetting properties are evaluated. Subsequently, the plasters are applied to a pre-wetted porous concrete plate and their processing properties are evaluated. After 3 days of aging, the following tests are made for establishing the water repellent properties of the plaster:

Water drop test

A drop of water of 2 cc is applied to the plaster, which is in horizontal position, and the time is measured until a dark zone is formed around the drop (1 mm water rim) which indicates wetting of the plaster. The time until the water was absorbed is likewise recorded.

Absorption test

The plaster is placed in vertical position and small elbow shaped test tubes are glued thereto; the length of the tubes is about 15 cm, the diameter 1 cm. After three hours, the quantity of water absorbed by the plaster is determined. The results are shown in Table 1.

TABLE 1

| | % in Formula | | | | | | | | | | | | | | | | |
|---|---|---|---|---|---|---|---|---|---|---|---|---|---|---|---|---|---|
| Sacharose monopalmitate | | 0 | 0.5 | 0.75 | 1 | 2 | | | | | | | | | | | |
| Sacharose distearate | " | | | | | | 0.5 | 0.75 | 1 | 2 | | | | | | | |
| Zinc stearate | " | | | | | | | | | | 0.5 | 0.75 | 1 | 2 | | | |
| Silicone powder | " | | | | | | | | | | | | | | 0.5 | 0.75 | 1 | 2 |
| Stirring time in Minutes | | 6 | 5 | 5 | 5 | 5 | 5 | 5 | 5 | 5 | 5 | 6 | 6 | 7 | 5 | 7 | 7 | 10 |
| Wetting | | good | good | very good | very good | very good | good | very good | very good | very good | good | acceptable | bad | bad | good | acceptable | bad | bad |
| Workability on Possibility to make porous on gas concrete foamed concrete | | medium | good | very good | good | medium | good | very good | very good | good | medium | bad | bad | bad | bad | bad | bad | bad |
| Water drop test run after minutes | | 1 | 15 | 15 | 15 | 25 | 15 | 15 | 15 | 27 | 1 | 4 | 4 | 25 | 4 | 5 | 5 | 5 |
| Time for absorbing in minutes | | 25 | 90 | 240 | 330 | 360 | 100 | 120 | 150 | 300 | 25 | 37 | 39 | 40 | 70 | 80 | 80 | 80 |
| Water absorption with test tube in cc | | >5 | 1,8 | 1,4 | 0,4 | 0,4 | 3,2 | 2,2 | 1,8 | 0,8 | >5 | >5 | 5 | 4,1 | 4,3 | 4 | 3,7 | 0,7 |

EXAMPLE 2

A priming material is made according to the following formulation:

55.0 kg quartz powder, grain size 150 μ
5.0 kg limestone powder, grain size up to a maximum of 60 μ
36.0 kg Portland cement 350°F
4.0 kg casein
35.0 kg water To this priming material, we add 0, 0.5, 0.75, 1 and 2% of a sacharose trioleate. The priming material was poured onto a concrete pavement plate and allowed to harden. After 7 days, the water drop test was carried out as described in example 1. The results were as follows:

TABLE 2

| % Additive | 0 | 0.5 | 0.75 | 1 | 2 |
|---|---|---|---|---|---|
| Water rim after minutes | 20 | 120 | 200 | 260 | >260 |
| Time for absorption of the drop | 40 | 300 | 360 | >360 | >360 |

EXAMPLE 3

In analogy to DIN 1164, a mortar consisting of 1 part Portland cement and 3 parts quartz sand of grain size 0–0.7 was prepared to which was added (a) 0% (b) 1% calculated on cement of a sacharose ester consisting of about 70% monoester and 30% di- and triester; the fatty acid of the ester being about 30% stearate and 70% palmitate. Of the mortar according to DIN 1164, prisms were made of a size 4 × 4 × 16 cm which were stored for 28 days in standard climate at 23°C with a relative humidity of the air of 50%. Subsequently, they were stored under water for 7 days. The test pieces were then broken up and it was determined to what extent they had been wetted during the storage in water. The mortar prisms without added sacharose ester were completely wetted through; those with 1% sacharose ester calculated on cement, showed water absorption in depth of about 1–2 mm.

What is claimed is:

1. A coating composition for application to buildings to render them water repellent, comprising:
    a. 1 part by weight of a member of the group consisting of cement, lime, and mixtures thereof;
    b. from about 1 to 12 parts by weight of a weatherproof filler material having a grain size not greater than about 7 mm.;
    c. as a hydrophobing additive, about 0.1 to about 3% by weight, calculated on the total weight of dry material, of at least one water soluble ester of saccharose with a fatty acid containing from 10 to 20 carbon atoms.

2. The coating composition of claim 1 in which said fatty acid contains 16 to 18 carbon atoms.

3. The coating composition of claim 1 which further contains about 0.2 to 5% by weight of casein calculated on the total weight of dry material.

4. The coating composition of claim 1 which further contains about 0.01 to 0.5% by weight, calculated on the total weight of dry material, of an ether selected from the group consisting of a water soluble cellulose ether and a starch ether.

5. The composition of claim 1 which further contains from 0.1 to 5% by weight, calculated on the total weight of dry material, of a redispersible powder additive selected from the group consisting of a copolymer of ethylene and vinyl acetate, a homopolymer of vinyl acetate, a copolymer of butadiene and styrene, and an acrylic ester polymer.

* * * * *